United States Patent
Kim (10) Patent No.: US 10,724,626 B2
(45) Date of Patent: Jul. 28, 2020

(54) SHIFT CONTROL DEVICE USING DOUBLE HINGE

(71) Applicant: KYUNG CHANG INDUSTRIAL CO., Ltd., Daegu (KR)

(72) Inventor: Dong Won Kim, Daegu (KR)

(73) Assignee: KYUNG CHANG INDUSTRIAL CO., Ltd., Daegu (KR)

( * ) Notice: Subject to any disclaimer, the term of this patent is extended or adjusted under 35 U.S.C. 154(b) by 41 days.

(21) Appl. No.: 16/135,673

(22) Filed: Sep. 19, 2018

(65) Prior Publication Data

US 2019/0101209 A1 Apr. 4, 2019

(30) Foreign Application Priority Data

Sep. 29, 2017 (KR) .................. 10-2017-0127957

(51) Int. Cl.
*F16H 59/02* (2006.01)
*F16H 59/10* (2006.01)
*F16H 61/24* (2006.01)

(52) U.S. Cl.
CPC ........... *F16H 59/105* (2013.01); *F16H 59/02* (2013.01); *F16H 61/24* (2013.01); *F16H 2059/026* (2013.01); *F16H 2061/247* (2013.01)

(58) Field of Classification Search
CPC ........ F16H 59/105; F16H 59/02; F16H 61/24; F16H 2059/026; F16H 2061/247
See application file for complete search history.

(56) References Cited

U.S. PATENT DOCUMENTS

| 5,249,478 A | * | 10/1993 | Moroto | F16H 59/0204 74/473.18 |
| 5,899,115 A | | 5/1999 | Kataumi et al. | |
| 6,230,579 B1 | * | 5/2001 | Reasoner | F16H 59/0204 74/473.18 |
| 6,295,886 B1 | * | 10/2001 | Russell | F16H 59/0204 74/473.18 |
| 6,325,196 B1 | * | 12/2001 | Beattie | F16H 59/0204 192/220.4 |

(Continued)

FOREIGN PATENT DOCUMENTS

JP    H09-226401 A    9/1997
KR    10-2017-0080086 A    7/2017

OTHER PUBLICATIONS

Korean Intellectual Property Office, Office Action, Korean Application No. 10-2017-0127957, dated Nov. 1, 2018, 8 pages.

(Continued)

*Primary Examiner* — David M Fenstermacher
(74) *Attorney, Agent, or Firm* — Fenwick & West LLP (57) ABSTRACT

A shift control device using a double hinge is provided that includes: a lever shift body; a shift lever which is coupled to the lever shift body; a detent system which is spaced apart from the shift lever by a predetermined distance and is disposed in the lever shift body; a hinge system which is disposed under the lever shift body; and a base which is fastened to the hinge system. The hinge system includes a guide hinge and a shaft select. The guide hinge is disposed under the lever shift body. The shaft select is inserted into the guide hinge. The shift lever rotates about the shaft select in a select direction and rotates about the guide hinge in a shift direction.

14 Claims, 10 Drawing Sheets

(56) References Cited

U.S. PATENT DOCUMENTS

| | | | | |
|---|---|---|---|---|
| 2001/0032524 A1* | 10/2001 | Jezewski | ............. | F16H 59/0204 |
| | | | | 74/473.18 |
| 2004/0168537 A1* | 9/2004 | Koontz | ............... | F16H 59/0204 |
| | | | | 74/473.18 |
| 2005/0193853 A1* | 9/2005 | Zelman | .................. | B60K 20/02 |
| | | | | 74/473.18 |
| 2005/0223834 A1* | 10/2005 | Otsuka | ................ | F16H 59/0204 |
| | | | | 74/473.18 |
| 2005/0223835 A1* | 10/2005 | Wang | .................... | F16H 59/105 |
| | | | | 74/473.18 |
| 2006/0016286 A1* | 1/2006 | De Jonge | ............ | F16H 59/0204 |
| | | | | 74/473.18 |
| 2007/0137362 A1* | 6/2007 | Kortge | .................... | F16H 61/24 |
| | | | | 74/473.18 |

OTHER PUBLICATIONS

Chinese National Intellectual Property Administration, Office Action, Chinese Application No. 201811151118.9, dated Dec. 18, 2019, 6 pages (with concise explanation of relevance).

\* cited by examiner

SHIFT CONTROL DEVICE USING DOUBLE HINGE

CROSS-REFERENCE TO RELATED APPLICATIONS

This application claims the priority benefit of Republic of Korea Patent Application No. 10-2017-0127957 filed on Sep. 29, 2017, which is incorporated by reference in its entirety.

BACKGROUND

Field

The present disclosure relates to a shift control device and more particularly to a shift control device which manipulates a shift lever in a shift direction and in a select direction by using a double hinge.

Description of the Related Art

Generally, in a vehicle equipped with an automatic transmission, hydraulic pressure is controlled within a shift range set according to the travel speed of the vehicle, so that a gearshift of a target shift range is automatically operated.

The automatic transmission produces gear ratios by using a hydraulic circuit, a planetary gear, and friction elements in order to perform the shifting. These components are controlled by a transmission control unit (TCU).

Unlike an existing mechanical transmission system, a shift-by-wire (hereinafter, referred to as SBW) system that is an electronic transmission system for a vehicle has no mechanical connection structure such as a cable, between the transmission and the shift lever. When a sensor value generated by operating an electronic shift lever or a button is transmitted to the TCU, a solenoid or an electric motor is operated by an electronic signal commanded by the TCU, and a hydraulic pressure is applied to or shut off from the hydraulic circuit for each shift stage by the operation of the solenoid or the electric motor, so that the shift control is performed electronically.

Therefore, the automatic transmission based on the SBW has an advantage that driver's shift intention is transmitted in the form of an electric signal to the transmission control device by the simple operation of the electronic shift lever or the button, so that it is easier to shift the gear to drive (D) and reverse (R), neutral (N), and parking (P) ranges. Also, the shift lever can become smaller, and thus, a wide space can be secured between the driver seat and the passenger seat.

A lever-type electronic transmission system in which the shift operation is performed by means of a lever has a shift lever operation method similar to that of a mechanical shift lever, and thus, has no sense of heterogeneity compared to the mechanical shift lever. Moreover, due to a large space in the console, a space for peripheral parts such as a cup holder becomes relatively smaller.

For the purpose of overcoming these disadvantages, many researches are being devoted to a button-type electronic transmission system without using a lever-type transmission system.

Regarding the lever-type electronic transmission system, there is a requirement for a transmission system which has improved driver's shift operation feeling, a smaller number of parts that constitute the transmission system, simpler component configurations, thereby being easy to assemble and reducing a size thereof.

SUMMARY

Technical Problem

An object of the present disclosure is to provide a shift control device using a double hinge, which provides a driver with improved shift operation feeling.

Another object of the present disclosure is to provide a shift control device using a double hinge, which has a smaller number of parts that constitute the transmission system and has simpler component configurations, thereby being easy to assemble and reducing a size thereof.

Further another object of the present disclosure is to provide a shift control device using a double hinge, which minimizes the number of parts constituting the shift control device, thereby reducing the manufacturing cost thereof and increasing the utilization of the space occupied thereby.

However, the object of the present disclosure is not limited to the above description and can be variously extended without departing from the scope and spirit of the present invention.

Technical Solution

One embodiment is a shift control device using a double hinge may be provided that includes: a lever shift body; a shift lever which is coupled to the lever shift body; a detent system which is spaced apart from the shift lever by a predetermined distance and is disposed in the lever shift body; a hinge system which is disposed under the lever shift body; and a base which is fastened to the hinge system. The hinge system includes a guide hinge and a shaft select. The guide hinge is disposed under the lever shift body. The shaft select is inserted into the guide hinge. The shift lever rotates about the shaft select in a select direction and rotates about the guide hinge in a shift direction.

The shift control device further includes a shift position sensor. The shift position sensor includes a magnet and a detection sensor. The magnet is disposed under the hinge system. The detection sensor is disposed under the magnet. The detection sensor detects a motion of the magnet and a shift stage is selected.

The lever shift body includes: a body part to which the shift lever is coupled; a first wing which is formed to protrude from the body part in one direction; and a second wing which is formed to protrude in a direction opposite to the one direction. A plurality of protrusions protruding downward from a bottom surface of the body part are formed on the body part. A through-hole passing through the protrusions is formed in each of the plurality of protrusions. A wing groove having a predetermined depth is formed in the first wing and the second wing respectively in such a manner as to be inclined with respect to the body part.

The shift control device further includes a bracket. The detent system includes: a bullet elastic member; a bullet bar which is elastically supported by one end of the bullet elastic member; and a groove which has a plurality of catching grooves and is disposed on the bullet bar. The groove is fixed to an inner surface of the bracket. One end of the bullet bar is elastically supported by the bullet elastic member and the other end of the bullet bar contacts the groove. The bullet elastic member and the bullet bar are disposed in the wing groove.

The hinge system further includes: a bush which is fastened to the guide hinge; and a holder which is fastened to the bush. A longitudinal direction of the guide hinge is an x-axis direction. A direction vertically perpendicular to the longitudinal direction of the guide hinge is a y-axis direction. A direction horizontally perpendicular to the longitudinal direction of the guide hinge is a z-axis direction. The guide hinge includes a first through-hole and a second through-hole. The first through-hole is formed to pass through the guide hinge in the z-axis direction. The second through-hole is formed to pass through the guide hinge in the y-axis direction. The bush is fastened to both ends of the guide hinge in the x-axis direction, respectively. The shaft select is disposed in the first through-hole.

The lever shift body includes a body part to which the shift lever is coupled. A plurality of protrusions protruding downward from a bottom surface of the body part are formed on the body part. The plurality of protrusions include a first protrusion, a second protrusion, and a third protrusion. The shaft select is disposed in the through-hole formed in the first protrusion, the second protrusion, and the third protrusion respectively. The first protrusion and the third protrusion are disposed on both ends of the shaft select. The second protrusion is inserted into the second through-hole.

A groove opened downward is formed in a bottom surface of the second protrusion. The magnet is disposed in the groove formed in the bottom surface of the second protrusion.

The base includes a base groove and a holder fastening portion. The hinge system is disposed on the base groove. The holder is disposed on the holder fastening portion.

The guide hinge further includes a hinge protrusion. The hinge protrusion protrudes from both ends of the guide hinge in the x-axis direction by a predetermined length respectively. The bush is fastened to the hinge protrusion.

The bush includes a ring and a bush protrusion. A diameter of the ring is reduced from one side to the other side thereof. The bush protrusion protrudes circumferentially from one side of the ring by a predetermined length.

The ring or the bush protrusion has one or more incised portions.

The holder includes a groove. The ring is inserted into the groove of the holder.

The lever shift body includes a body part to which the shift lever is coupled. The shift lever includes a rod, a rod elastic member, and a shift pipe. A body part top surface groove having a predetermined depth is formed in a top surface of the body part. The shift pipe is inserted into the body part top surface groove. The rod and the rod elastic member are inserted into the shift pipe. The rod is disposed on the rod elastic member.

The shift control device further includes a rod pin. The rod pin is a cylindrical rod or a polygonal rod, which has a predetermined length. A pin through-hole passing through a side surface of the body part is formed in the upper side surface of the body part. A pipe through-hole passing through the shift pipe in a direction perpendicular to a longitudinal direction of the shift pipe is formed in a lower portion of the shift pipe. A rod through-hole passing through the rod in a direction perpendicular to a longitudinal direction of the rod is formed in a lower portion of the rod. The rod pin is inserted into the pin through-hole, the pipe through-hole, and the rod through-hole.

The pin through-hole is formed to have a predetermined length from an upper side surface to a lower side surface of the body part. The pipe through-hole is formed to have a predetermined length in the longitudinal direction of the shift pipe. The rod pin is arranged to pass through the pin through-hole, the pipe through-hole, and the rod through-hole. The rod pin moves along the pin through-hole and the pipe through-hole in the longitudinal direction of shift pipe.

Advantageous Effects

A shift control device using a double hinge according to an embodiment of the present disclosure can provide a driver with improved shift operation feeling.

The shift control device using a double hinge according to the embodiment of the present disclosure provides a shift control device using a double hinge, which has a smaller number of parts that constitute the transmission system and has simpler component configurations, thereby being easy to assemble and reducing a size thereof.

The shift control device using a double hinge according to the embodiment of the present disclosure minimizes the number of parts constituting the shift control device, thereby reducing the manufacturing cost thereof and increasing the utilization of the space occupied thereby.

However, the effect of the embodiment of the present invention is not limited to the effects described above and can be variously modified without departing from the spirit and scope of the present invention.

BRIEF DESCRIPTION OF THE DRAWINGS

FIG. 5B(*i*) and FIG. 5B(*ii*) are views showing the detent system of the shift control device according to the embodiment of the present disclosure;

DETAILED DESCRIPTION

Embodiments of the present disclosure will be described in more detail with reference to the accompanying drawings. In the components of the present invention, detailed descriptions of what can be clearly understood and easily carried into practice through prior art by those skilled in the art will be omitted to avoid making the subject matter of the present invention unclear.

Hereinafter, a shift control device using a double hinge according to an embodiment of the present invention will be described.

Figure 1:
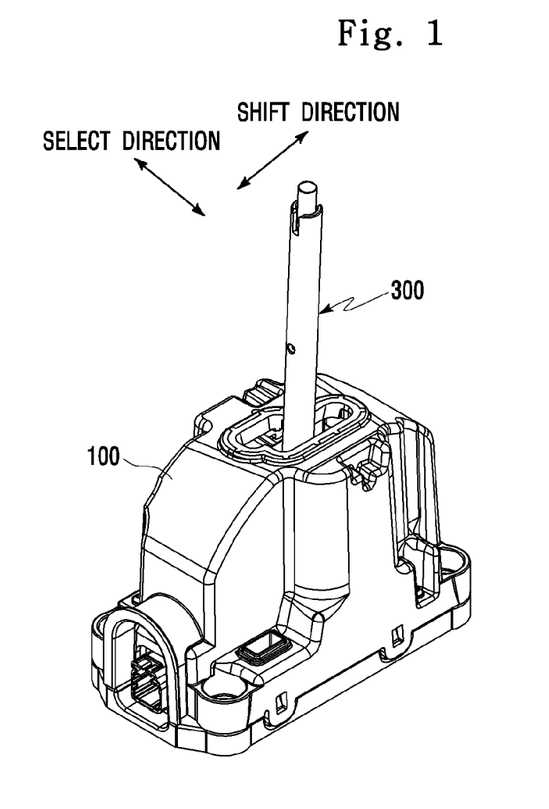
FIG. 1 is a perspective view showing a shift control device using a double hinge according to an embodiment of the present disclosure.
Figure 2:
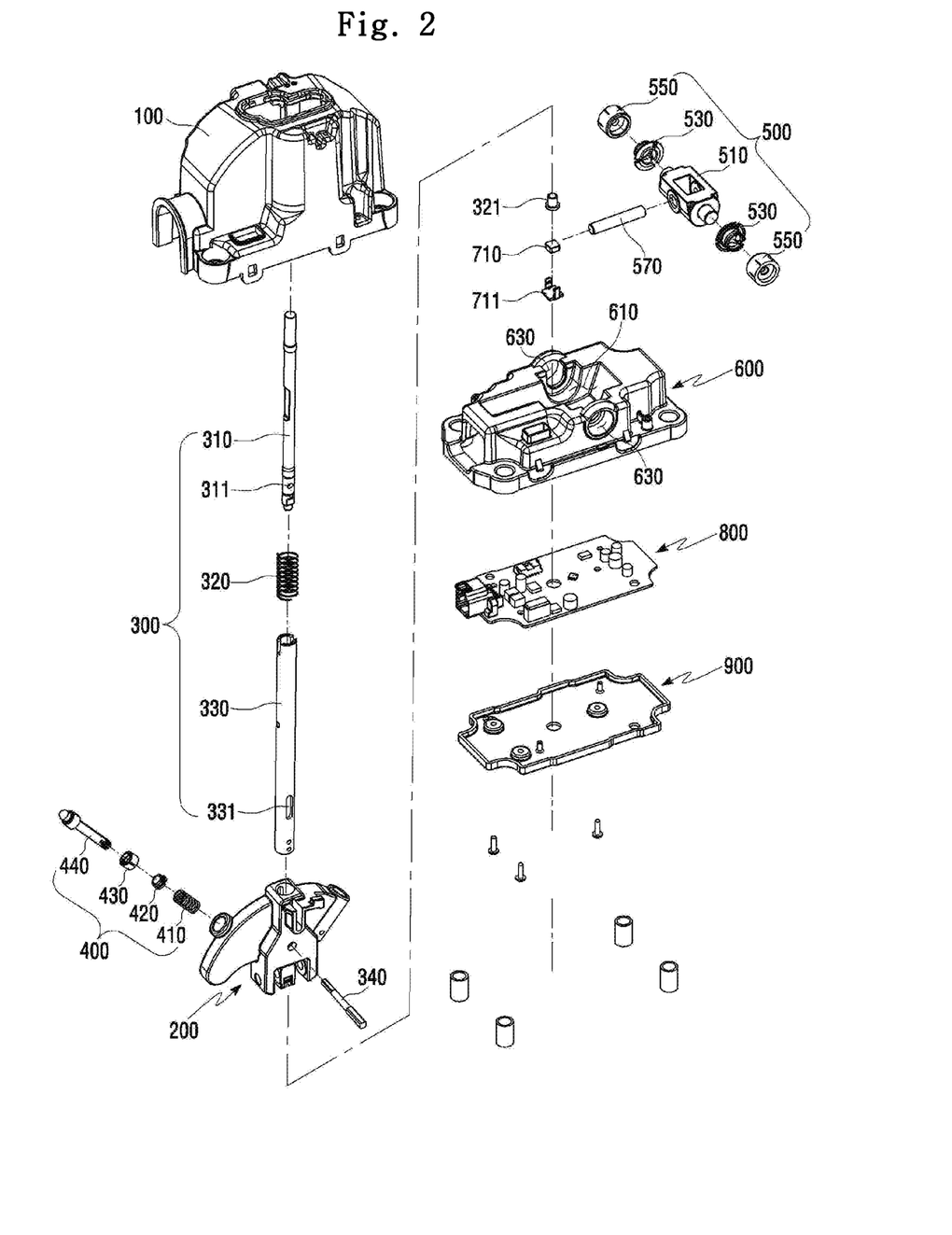
FIG. 2 is an exploded perspective view showing the shift control device using a double hinge of FIG. 1 according to an embodiment of the present disclosure.

FIG. 1 is a perspective view showing a shift control device using a double hinge according to an embodiment of the present invention. FIG. 2 is an exploded perspective view showing the shift control device using a double hinge of FIG. 1.

Figure 11A:
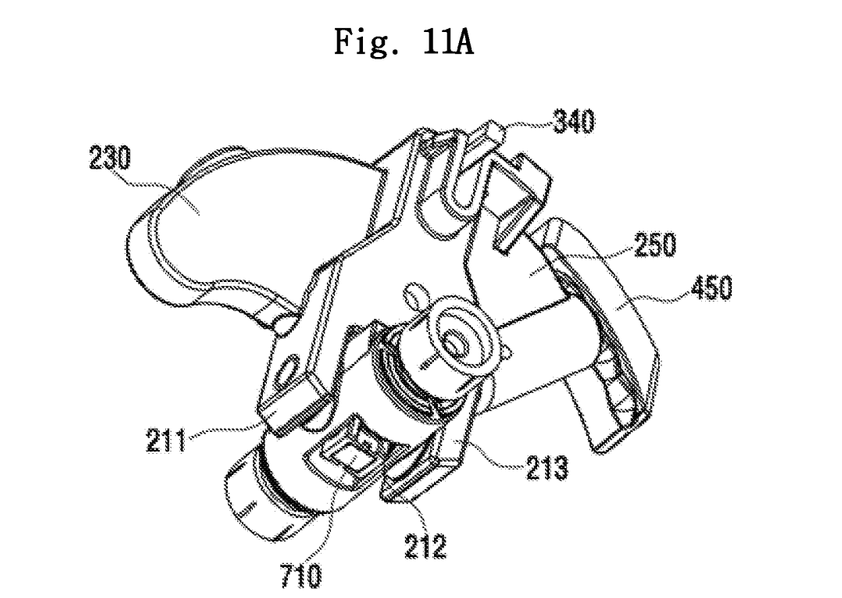
FIGS. 11A and 11B are views showing a shift position sensor of the shift control device according to the embodiment of the present invention.
Figure 11B:
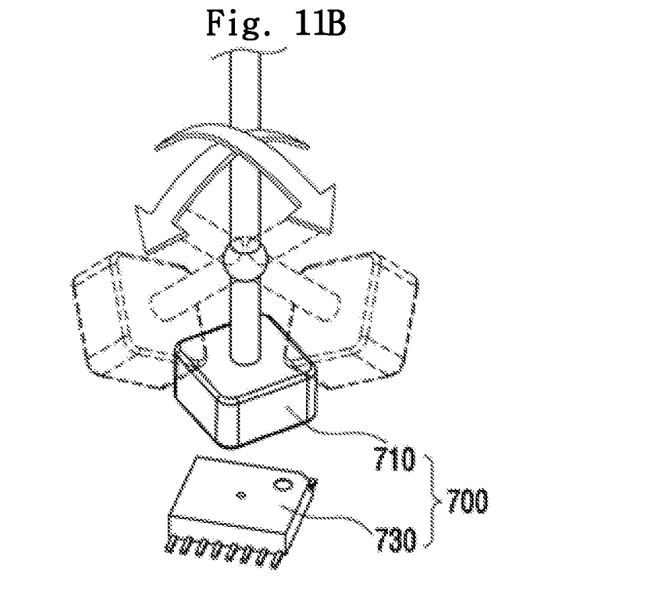

Referring to FIGS. 1 and 2, the shift control device using a double hinge according to the embodiment of the present disclosure may include a bracket 100, a lever shift body 200, a shift lever 300, a detent system 400, a hinge system 500, a base 600, and a shift position sensor 700 (shown in FIG. 11B). Respective components will be described below in detail.

<Bracket 100>

The bracket 100 forms the exterior of the shift control device using a double hinge according to the embodiment of the present disclosure. The bracket 100 is coupled to the below-described base 600. The bracket 100 may be formed in various shapes such that various components constituting the shift control device according to the embodiment of the present invention can be fixed and coupled thereto.

<Lever Shift Body 200>

Figure 3A:
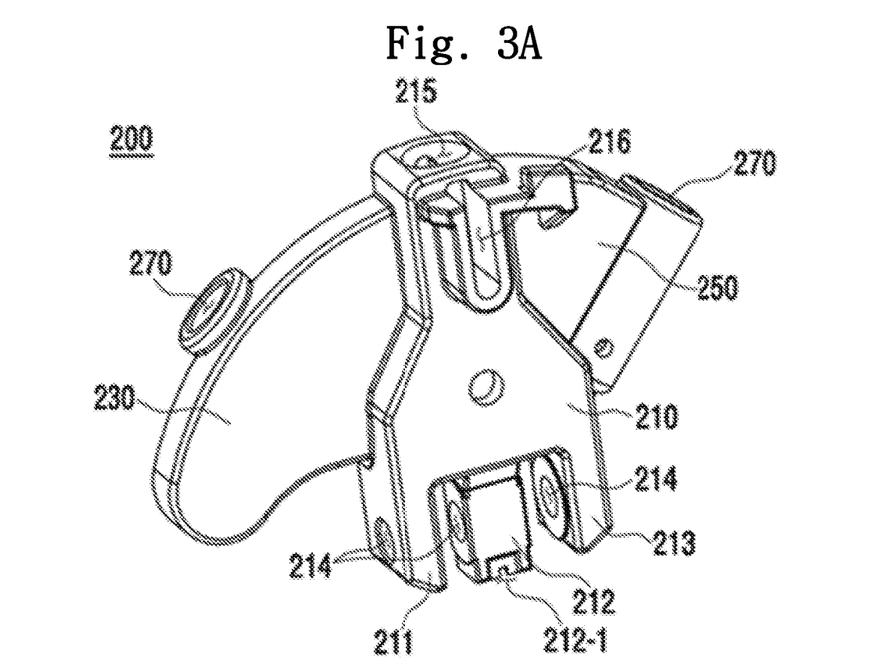
FIGS. 3A and 3B are views showing a lever shift body of the shift control device according to the embodiment of the present disclosure.
Figure 3B:
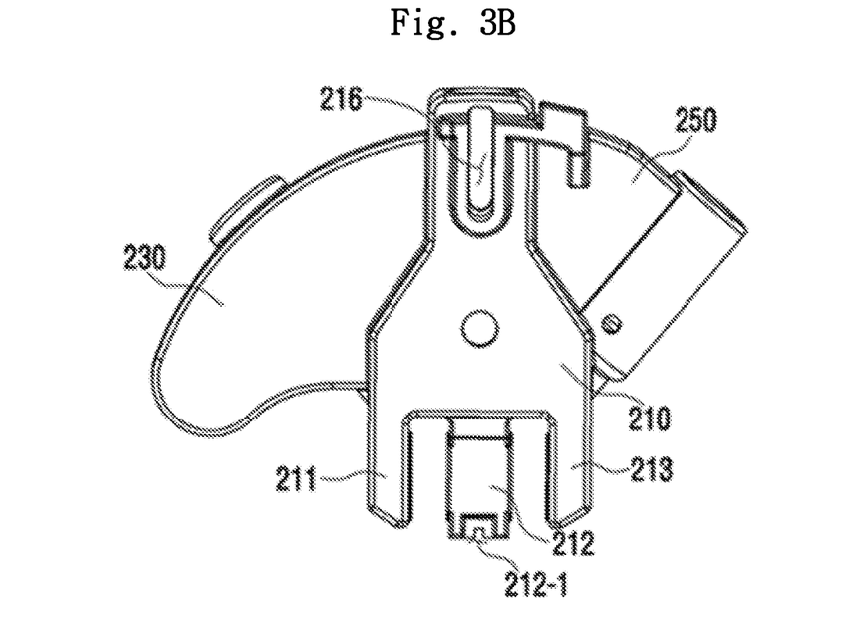

FIGS. 3A and 3B are views showing the lever shift body of the shift control device according to the embodiment of the present invention.

Referring to FIGS. 3A and 3B, the lever shift body 200 may include a body part 210, a first wing 230, and a second wing 250.

The body part 210 corresponds to the central portion of the lever shift body 200. The shift lever 300 may be coupled to the top surface of the body part 210. Specifically, a body part top surface groove 215 having a predetermined depth may be formed in the top surface of the body part 210. The shift lever 300 may be inserted into and coupled to the body part top surface groove 215.

A plurality of protrusions 211, 212, and 213 protruding downward from the bottom surface of the body part 210 may be formed on the body part 210. A through-hole 214 passing through the protrusions may be formed in each of the plurality of protrusions 211, 212, and 213.

Specifically, the plurality of protrusions 211, 212, and 213 formed on the bottom surface of the body part 210 of the lever shift body 200 may include the first protrusion 211, the second protrusion 212, and the third protrusion 213. The shapes of the first protrusion 211, the second protrusion 212, and the third protrusion 213 may be the same as each other or may be different from each other. The protrusion may have various shapes.

A groove 212-1 opened downward may be formed in the bottom surface of the second protrusion 212. A below-described magnet 710 may be disposed in the groove 212-1 formed in the bottom surface of the second protrusion 212.

The through-hole 214 which is formed in and passes through the protrusions 211, 212, and 213 respectively may be formed in the protrusions 211, 212, and 213 in a direction perpendicular to the longitudinal direction of the protrusions 211, 212, and 213.

A below-described shaft select 570 may be disposed in the through-hole 214 formed in the first protrusion 211, the second protrusion 212, and the third protrusion 213. The first protrusion 211 and the third protrusion 213 may be disposed on both ends of the shaft select 570, and the second protrusion 212 may be inserted into a below-described second through-hole 512 of a guide hinge 510.

The first wing 230 may be formed to protrude from the body part 210 in one direction. The second wing 250 may be formed to protrude in a direction opposite to the one direction. The first wing 230 and the second wing 250 may be formed symmetrically or asymmetrically with respect to the body part 210. When a driver moves the shift lever 300, the lever shift body 200 coupled to the shift lever 300 rotates. Therefore, the first wing 230 and the second wing 250 may be formed in various shapes including a shape making it easier for the lever shift body to rotate.

A wing groove 270 having a predetermined depth is formed in the first wing 230 and the second wing 250 respectively in such a manner as to be inclined with respect to the body part 210. Specifically, the wing groove 270 has a predetermined depth and is disposed to be inclined with respect to the body part 210. The upper portion of the wing groove 270 may be further spaced apart from the body part 210 than the lower portion of the wing groove 270.

The wing groove 270 may have a predetermined depth and may be formed to have a variety of shapes including a circular shape, a polygonal shape, etc.

A below-described bullet elastic member 410 and a below-described bullet bar 440 may be disposed in the wing groove 270.

A pin through-hole 216 passing through the side surface of the body part 210 may be formed in the upper side surface of the body part 210. Specifically, the pin through-hole 216 may be formed to have a predetermined length from the upper side surface to the lower side surface of the body part 210.

A below-described rod pin 340 may be inserted into the pin through-hole 216. In the state where the rod pin 340 is inserted into the pin through-hole 216, the rod pin 340 can move along the pin through-hole 216 from the upper side surface to the lower side surface of the body part 210.

<Shift Lever 300>

Figure 4A:
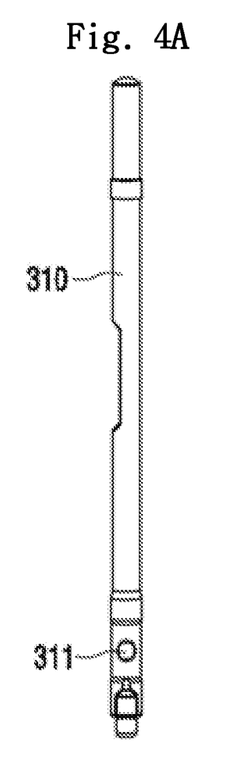
FIGS. 4A, 4B, and 4C are views showing a shift lever of the shift control device according to the embodiment of the present disclosure.
Figure 4B:
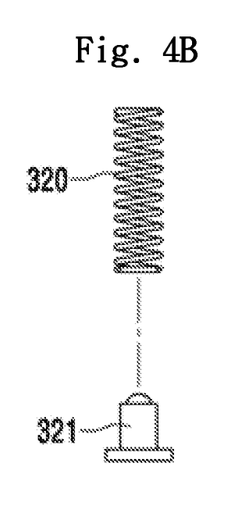
Figure 4C:
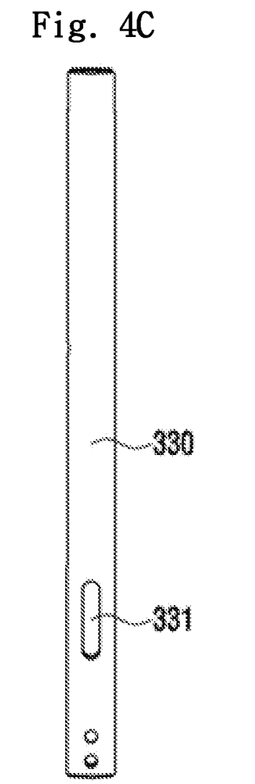

FIGS. 4A, 4B, and 4C are views showing the shift lever 300 of the shift control device according to the embodiment of the present invention. A rod 310 is shown in FIG. 4A. A rod elastic member 320 is shown in FIG. 4B. A shift pipe 330 is shown in FIG. 4C.

Referring to FIG. 4, the shift lever 300 may include the rod 310, the rod elastic member 320, and the shift pipe 330.

The shift lever 300 may be coupled to the lever shift body 200. Specifically, the shift pipe 330 may be inserted into the body part top surface groove 215 of the lever shift body 200.

The shift pipe 330 may have a hollow cylindrical shape having both through ends. However, the shift pipe 330 may have a polygonal tubular shape without being limited to the cylindrical shape. Also, the shift pipe 330 may have a cylindrical or polygonal tubular shape of which only one of both ends thereof is open.

A pipe through-hole 331 passing through the shift pipe 330 in a direction perpendicular to the longitudinal direction of the shift pipe 330 may be formed in the lower portion of the shift pipe 330. Specifically, the pipe through-hole 331 may be formed to have a predetermined length in the longitudinal direction of the shift pipe 330.

The below-described rod pin 340 may be inserted into the pipe through-hole 331. In the state where the rod pin 340 is inserted into the pipe through-hole 331, the rod pin 340 can move along the pipe through-hole 331 in the longitudinal direction of the shift pipe 330.

The rod elastic member 320 and the rod 310 may be inserted into the shift pipe 330. Specifically, the rod elastic member 320 may be inserted into the shift pipe 300 first, and then the rod 310 may be inserted.

The rod elastic member 320 may be a commonly used elastic spring. The shift control device according to the embodiment of the present invention may include an elastic member guide 321. The elastic member guide 321 may be disposed under the rod elastic member 320. The elastic member guide 321 is able to allow the rod elastic member 320 to be positioned at the center of the elastic member guide 321. That is, the elastic member guide 321 is able to serve to hold the rod elastic member 320 so as to prevent the rod elastic member 320 from leaning to the right and left. This can reduce the loss of elastic force of the rod elastic member 320 and reduce the noise during the operation thereof. As shown in FIG. 4B, the shape of the elastic member guide 321 is not limited to this. So long as the elastic member guide 321 serves to hold the rod elastic member 320 so as to prevent the rod elastic member 320 from leaning to the right and left, the elastic member guide 321 can have various shapes.

A rod through-hole 311 passing through the rod 310 in a direction perpendicular to the longitudinal direction of the rod 310 may be formed in the lower portion of the rod 310. The below-described rod pin 340 may be inserted into the rod through-hole 311.

The rod pin 340 may be a rod made of a plastic material or a metallic material. The rod pin 340 may be a cylindrical rod or a polygonal rod, which has a predetermined length.

When the shift pipe 330 is inserted into the body part top surface groove 215 of the lever shift body 200 and the rod 310 is inserted into the shift pipe 330, the rod pin 340 is arranged to pass through the pin through-hole 216 of the lever shift body 200, the pipe through-hole 331 of the shift pipe 330, and the rod through-hole 311 of the rod 310. In this case, the rod pin 340 is able to move along the pin through-hole 216 and the pipe through-hole 331 in the longitudinal direction of shift pipe 330. When the rod pin 340 moves in the longitudinal direction of shift pipe 330, the rod 310 can move together with the rod pin 340 as well.

The rod pin 340 can be interlocked with a knob button (not shown) to select the shift position of each shift stage. A detent structure for each shift position may be formed <Detent System 400>

Figure 5A:
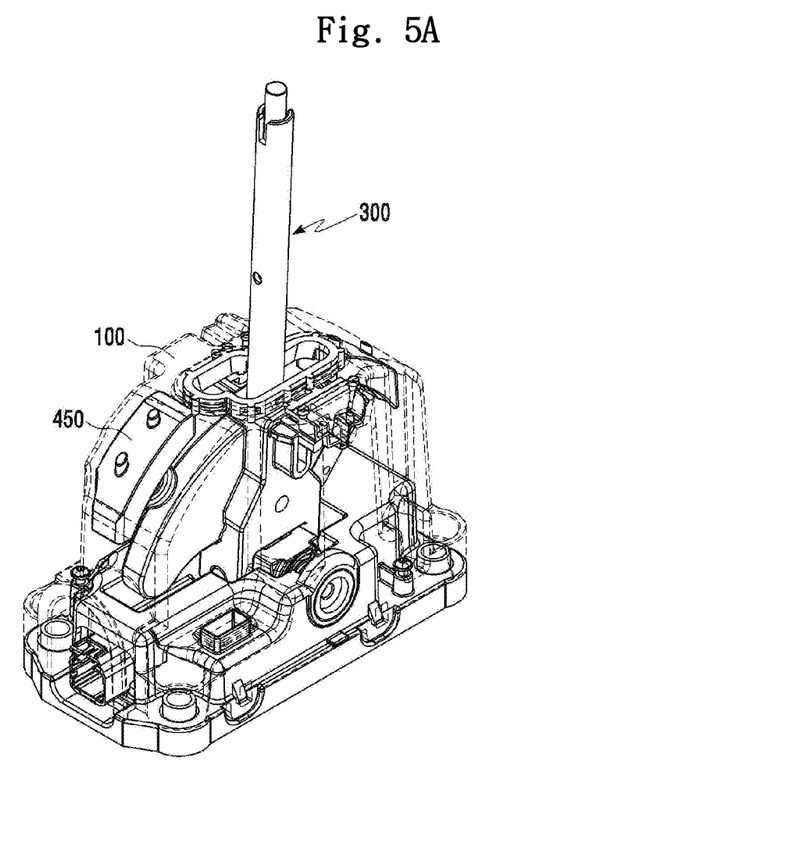
FIG. 5A is a perspective view showing that a detent system of the shift control device according to the embodiment of the present disclosure is arranged within the shift control device.
Figure 5B:
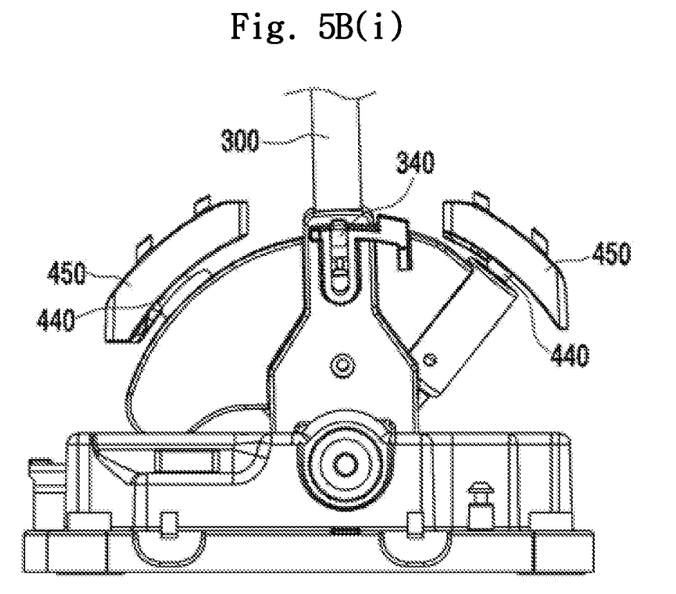

FIG. 5A is a perspective view showing that the detent system of the shift control device according to the embodiment of the present invention is arranged within the shift control device. FIGS. 5B(*i*) and 5B(*ii*) are views showing the detent system of the shift control device according to the embodiment of the present invention. Where the detent system 400 is disposed is shown in FIG. 5B(*i*) and the components of the detent system 400 are shown in FIG. 5B(*ii*).

Referring to FIGS. 5A and 5B, the detent system 400 may be spaced apart from the shift lever 300 by a predetermined distance and may be disposed in the lever shift body 200. The detent system 400 may include the bullet elastic member 410, the bullet bar 440, and a groove 450.

The bullet elastic member 410 may be a commonly used elastic spring. The bullet elastic member 410 may be disposed under the bullet bar 440 and support the bullet bar 440.

The bullet bar 440 can be elastically supported by one end of the bullet elastic member 410.

The bullet bar 440 may have a rod shape having a predetermined length. One end of the bullet bar 440 may be elastically supported by the bullet elastic member 410, and the other end of the bullet bar 440 may contact the groove 450.

Since the other end of the bullet bar 440 moves along a plurality of catching grooves formed in one surface of the groove 450, the other end of the bullet bar 440 may be formed in the form of a hemisphere such that the bullet bar 440 moves normally.

The bullet elastic member 410 and the bullet bar 440 may be disposed in the wing groove 270 formed respectively in the first wing 230 and the second wing 250 of the lever shift body 200.

One surface of the groove 450 may have the plurality of catching grooves and may be disposed on the bullet bar 440. When the driver moves the shift lever 300, the other end of the bullet bar 440 moves along the plurality of catching grooves formed in the one surface of the groove 450, so that the driver can feel shift operation feeling through this.

The groove 450 may be fixed to the inner surface of the bracket 100. According to the embodiment of the present invention, the groove 450 may be formed integrally with the bracket 100 on the inner surface of the bracket 100. When the groove 450 is formed integrally with the bracket 100, the plurality of catching grooves may be formed in the inner surface of the bracket 100. In this case, the other end of the bullet bar 440 moves along the plurality of catching grooves formed in the inner surface of the bracket 100, so that the driver can feel shift operation feeling through this.

According to the embodiment of the present invention, the detent system 400 may further include a first bullet ring 430 and a second bullet ring 420. The first bullet ring 430 and the second bullet ring 420 may have a hollow cylindrical shape having both through sides.

The first bullet ring 430 may be disposed between the bullet bar 440 and the second bullet ring 420. The first bullet ring 430 may fix the second bullet ring 420.

The second bullet ring 420 may be disposed between the first bullet ring 430 and the bullet elastic member 410. The second bullet ring 420 may fix the bullet elastic member 410.

According to the embodiment of the present invention, the bullet elastic member 410 can directly support the bullet bar 440. When the bullet elastic member 410 supports directly the bullet bar 440, both or either one of the first bullet ring 430 and the second bullet ring 420 can be omitted. When both or either one of the first bullet ring 430 and the second bullet ring 420 are omitted, the number of parts constituting the shift control device can be reduced, and thus, the manufacturing cost is reduced, and component configurations become simpler, so that time required for assembling can be minimized.

<Hinge System 500>

Figure 6:
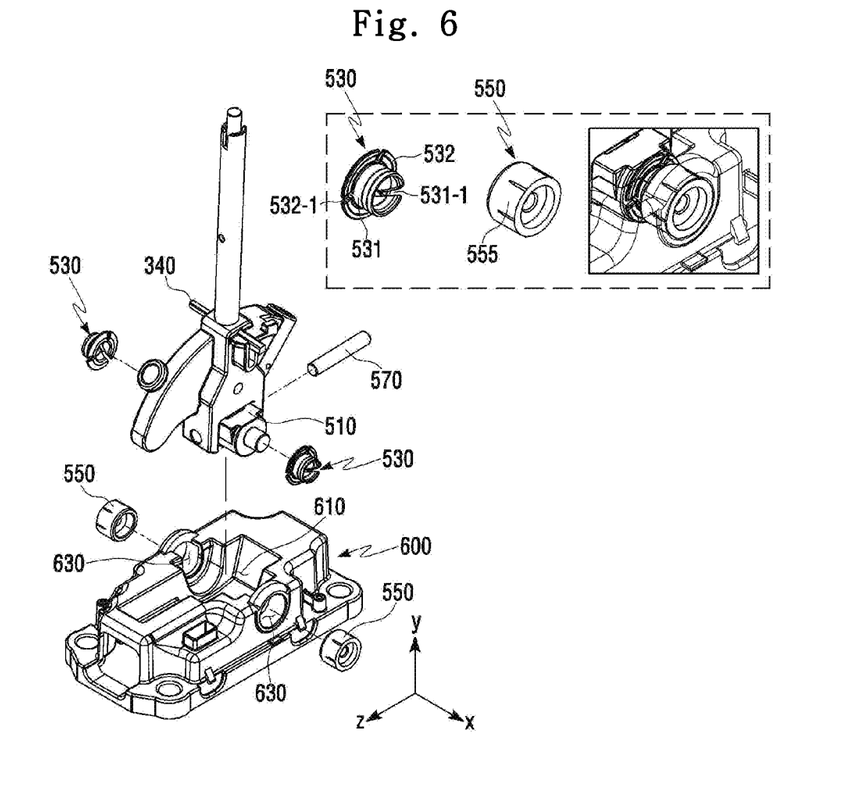
FIG. 6 is a view showing a hinge system of the shift control device according to the embodiment of the present disclosure.
Figure 7A:
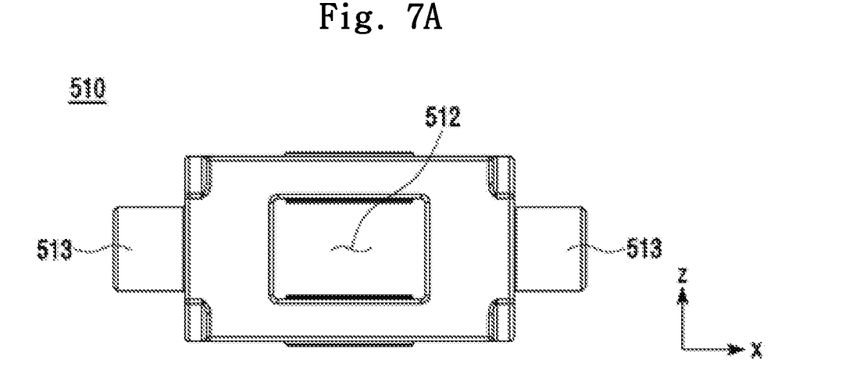
FIG. 7A and FIG. 7B are views showing a guide hinge of the shift control device according to the embodiment of the present disclosure.
Figure 7B:
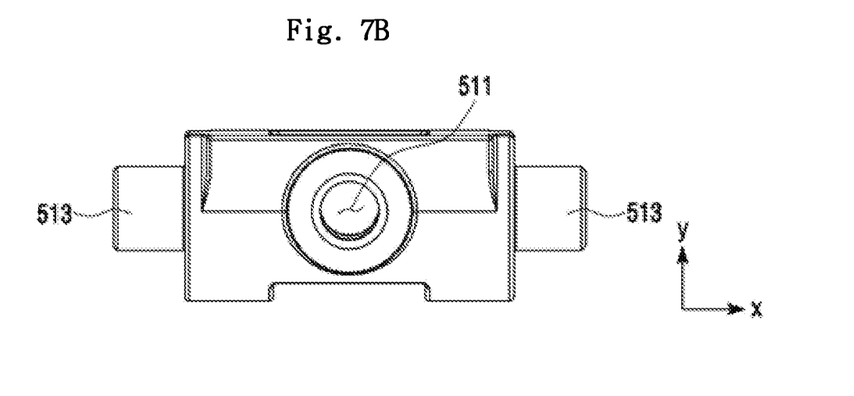
Figure 8:
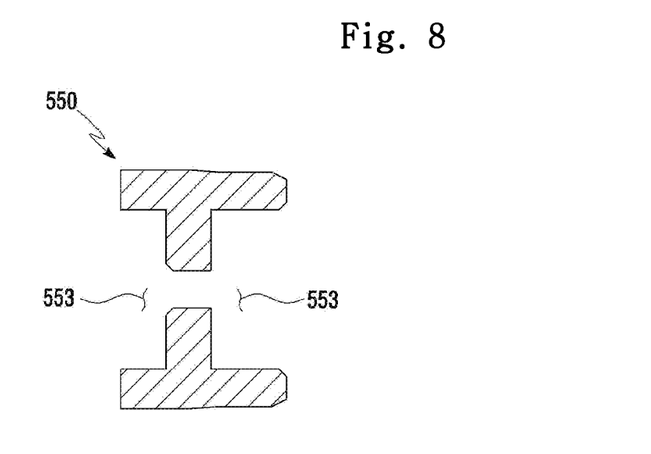
FIG. 8 is a cross sectional view showing a holder of the shift control device according to the embodiment of the present disclosure.
Figure 9:
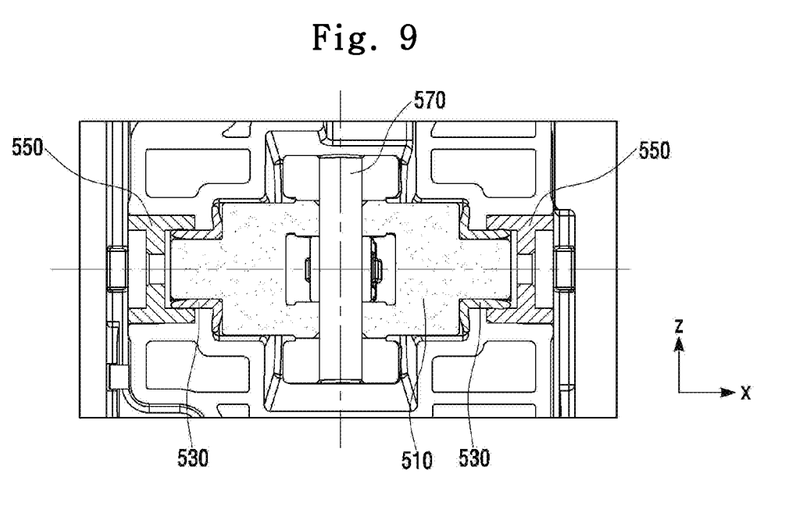
FIG. 9 is a view showing that the guide hinge and the shaft select of the shift control device according to the embodiment of the present disclosure have been fastened to a base of the shift control device.

FIG. 6 is a view showing a hinge system of the shift control device according to the embodiment of the present invention. FIGS. 7A and 7B are views showing a guide hinge of the shift control device according to the embodiment of the present invention. FIG. 8 is a cross sectional view showing a holder of the shift control device according to the embodiment of the present invention. FIG. 9 is a view showing that the guide hinge and the shaft select of the shift control device according to the embodiment of the present invention have been fastened to a base of the shift control device.

Referring to FIGS. 6 to 9, the hinge system 500 may be disposed under the lever shift body 200. The hinge system 500 may include a guide hinge 510, a bush 530, a holder 550, and a shaft select 570.

Before describing the guide hinge 510, the longitudinal direction of the guide hinge 510 is defined as an x-axis direction, a direction vertically perpendicular to the longitudinal direction of the guide hinge 510 is defined as a y-axis direction, and a direction horizontally perpendicular to the longitudinal direction of the guide hinge 510 is defined as a z-axis direction.

The guide hinge 510 may be disposed under the lever shift body 200. Specifically, the guide hinge 510 may be disposed between the first protrusion 211 and the third protrusion 213 which are formed on the bottom surface of the body part 210 of the lever shift body 200.

The guide hinge 510 may include a first through-hole 511 and a second through-hole 512. The first through-hole 511 may be formed to pass through the guide hinge 510 in the z-axis direction, and the second through-hole 512 may be formed to pass through the guide hinge 510 in the y-axis direction.

The shaft select 570 to be described below may be disposed in the first through-hole 511. The shape of the first through-hole 511 may correspond to the shape of the shaft select 570.

The second protrusion 212 formed on the bottom surface of the body part 210 of the lever shift body 200 may be inserted into the second through-hole 512. The shape of the second through-hole 512 may or may not correspond to the shape of the second protrusion 212. The second through-hole 512 may have various shapes such as a circular shape, a polygonal shape, and the like.

The guide hinge 510 may further include a hinge protrusion 513. The hinge protrusion 513 may protrude from both ends of the guide hinge 510 in the x-axis direction by a predetermined length respectively. The bush 530 to be described below may be fastened to the hinge protrusion 513.

The bush 530 may be fastened to the guide hinge 510. The bush 530 may be fastened to both ends of the guide hinge 510 in the x-axis direction, respectively. Specifically, the bush 530 may be fastened to the hinge protrusion 513 of the guide hinge 510.

The bush 530 may include a ring 531 and a bush protrusion 532.

The diameter of the ring 531 may be reduced from one side to the other side thereof in order that the bush 530 is easily fastened to the hinge protrusion 513 and is securely fixed to the hinge protrusion 513 after being fastened. Also, this intends that the holder 550 to be described below can be easily fastened to the ring 531 and is securely fixed to the ring 531 after being fastened.

The bush protrusion 532 may protrude circumferentially from one side of the ring 531 by a predetermined length. However, according to the embodiment of the present invention, the bush protrusion 532 may not be formed from one side of the ring 531. That is, the bush 530 may have only the ring 531 having a predetermined width without the bush protrusion 532.

The ring 531 or the bush protrusion 532 may have one or more incised portions 531-1 or 532-1. The incised portions 531-1 or 532-1 formed in the ring 531 or the bush protrusion 532 make it easier for the bush 530 to be fastened to the hinge protrusion 513. However, according to the embodiment of the present invention, the incised portions 531-1 or 532-1 may not be formed in the ring 531 or the bush protrusion 532.

The bush 530 can prevent the looseness of the hinge protrusion 513. According to the embodiment of the present invention, a tension may be generated in the bush 530, and the tension can minimize the looseness while the shape is deformed in a direction opposite to the tension when assembled.

The holder 550 may be fastened to the bush 530. Specifically, the holder 550 may be fastened on the ring 531 of the bush 530.

The holder 550 may include a groove 553. Specifically, as shown in FIG. 8, the groove 553 having open both sides thereof may be formed in the holder 550. However, according to the embodiment of the present invention, the groove 553 having open one side thereof may be formed only in one side of the holder 550. The ring 531 of the bush 530 may be inserted into the groove 553 of the holder 550.

The holder 550 may be fastened to a below-described holder fastening portion 630 formed in the base 600. According to the embodiment of the present invention, a rib 555 may be formed in the holder 550. After the holder 550 is fastened to the holder fastening portion 630, the rib 555 allows the holder 550 to be securely fixed to the holder fastening portion 630. In other words, the rib 555 can fix the holder fastening portion 630 without looseness.

The shaft select 570 may be inserted into the guide hinge 510. The shaft select 570 may have a circular rod shape having a predetermined length.

The shaft select 570 may be disposed in the through-hole 214 formed in the first protrusion 211, the second protrusion 212, and the third protrusion 213 which are formed on the bottom surface of the body part 210 of the lever shift body 200. The first protrusion 211 and the third protrusion 213 may be disposed on both ends of the shaft select 570. Also, the shaft select 570 may be disposed in the first through-hole 511 formed in the guide hinge 510.

The shape of the shaft select 570 may correspond to the shape of the through-hole 214 formed in the first protrusion 211, the second protrusion 212, and the third protrusion 213 and the shape of the first through-hole 511 formed in the guide hinge 510.

The shaft select 570 is able to serve as a rotational axis.

Figure 10A:
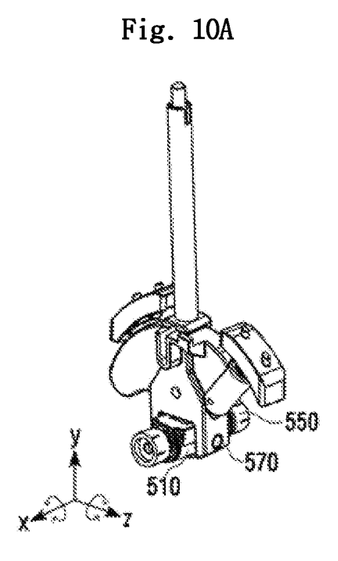
FIGS. 10A, 10B, and 10C are views showing the shift lever and the lever shift body of the shift control device according to the embodiment of the present disclosure are rotating about the guide hinge and the shaft select.
Figure 10B:
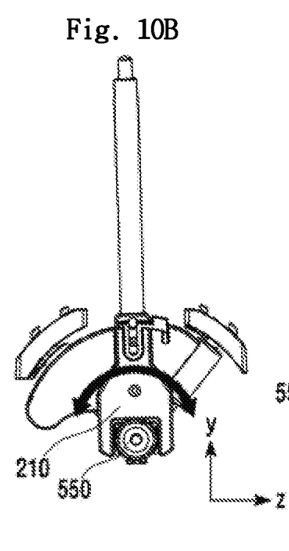
Figure 10C:
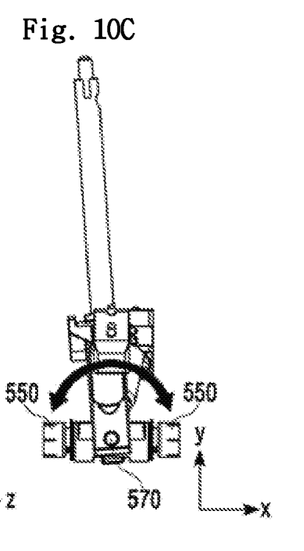

FIGS. 10A, 10B, and 10C are views showing the shift lever and the lever shift body of the shift control device according to the embodiment of the present invention are rotating about the guide hinge and the shaft select. A perspective view showing that the shift lever 300 and the lever shift body 200 rotate in a select direction and in a shift direction is shown in FIG. 10A. A view showing that the shift lever 300 and the lever shift body 200 rotate in the shift direction is shown in FIG. 10B. A view showing that the shift lever 300 and the lever shift body 200 rotate in the select direction is shown in FIG. 10C.

Referring to FIG. 10, the shift lever 300 and the lever shift body 200 of the shift control device according to the embodiment of the present invention may rotate about the shaft select 570 in the select direction. The fact that the shift lever 300 and the lever shift body 200 rotate in the select direction means that they rotate about the z-axis.

<Base 600>

Referring back to FIGS. 2 and 6, the base 600 may be fastened to the hinge system 500.

The base 600 may include a base groove 610 and the holder fastening portion 630. The hinge system 500 may be disposed on the base groove 610, and the holder 550 of the hinge system 500 may be disposed on the holder fastening portion 630.

The upper portion of the base groove 610 is opened. The base groove 610 may be formed to receive the hinge system 500.

The holder 550 of the hinge system 500 may be inserted into and fixed to the holder fastening portion 630. The shape of the holder fastening portion 630 may correspond to the shape of the holder 550.

Referring back to FIG. 10, the shift lever 300 and the lever shift body 200 of the shift control device according to the embodiment of the present invention may rotate about the guide hinge 510 in the shift direction. The fact that the shift lever 300 and the lever shift body 200 rotate in the shift direction means that they rotate about the x-axis.

The shift lever 300 and the lever shift body 200 of the shift control device using a double hinge according to the embodiment of the present invention can rotate about the shaft select 570 in the select direction and can rotate about the guide hinge 510 in the shift direction.

<Shift Position Sensor 700>

FIGS. 11A and 11B are views showing the shift position sensor 700 of the shift control device according to the embodiment of the present disclosure. The position of the magnet 710 is shown in FIG. 11A. The three-dimensional motion of the magnet 710 disposed on a detection sensor 730 is shown in FIG. 11B.

Referring to FIGS. 11A and 11B, the shift position sensor 700 may include the magnet 710 and the detection sensor 730.

The detection sensor 730 detects the motion of the shift lever 300 in the select direction or in the shift direction, and the shift stage that the driver wants can be selected. The detection sensor 730 detects the motion of the magnet 710, and the shift stage that the driver wants can be selected.

The magnet 710 may be disposed under the hinge system 500. Specifically, the groove 212-1 opened downward may be formed in the bottom surface of the second protrusion 212 formed on the bottom surface of the body part 210 of the lever shift body 200. The magnet 710 may be disposed in the groove 212-1 formed in the bottom surface of the second protrusion 212. The magnet 710 can be fixed by a magnet cover 711. The magnet cover 711 may be disposed under the magnet 710 and may be coupled to the bottom surface of the second protrusion 212.

The magnet 710 may generate a magnetic field. The shape of the magnet 710 is not particularly limited. The magnet 710 may have various shapes.

The detection sensor 730 may be disposed under the magnet 710. Specifically, the detection sensor 730 may be a 3D Hall sensor. The magnet 710 is disposed in the groove formed in the bottom surface of the second protrusion 212. Therefore, when the lever shift body 200 rotates in the select direction or in the shift direction, the magnet 710 can rotate in the select direction or in the shift direction as well. In this case, the detection sensor 730 can detect the magnetic field generated by the magnet 710.

<Substrate 800 and Substrate Cover 900>

A substrate 800 may be electrically connected to the detection sensor 730. Various electric and electronic parts which can receive a signal generated by the detection sensor 730 and control a transmission in such a manner as to allow the shift stage that the driver wants to be selected by processing the received signal may be disposed on the substrate 800.

The substrate cover 900 can protect the substrate 800. The substrate cover 900 can protect the substrate 800 vulnerable to moisture from moisture or water.

The shift control device using a double hinge according to the embodiment of the present invention can provide a driver with improved shift operation feeling by disposing the detent system 400 in a double manner.

Also, the double hinge structure is formed by disposing the shaft select 570 within the guide hinge 510, so that the number of parts constituting the shift control device can be reduced and the component configurations becomes simpler. Therefore, the shift control device is easy to assemble and the size of the shift control device can be reduced.

The shift control device using a double hinge according to the embodiment of the present invention minimizes the number of parts constituting the shift control device, thereby reducing the manufacturing cost thereof and increasing the utilization of the space occupied thereby.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A shift control device using a double hinge, the shift control device comprising:
    a lever shift body;
    a shift lever which is coupled to the lever shift body;
    a detent system which is spaced apart from the shift lever by a predetermined distance and is disposed in the lever shift body;
    a hinge system which is disposed under the lever shift body;
    a base which is fastened to the hinge system; and
    a shift position sensor,
    wherein the hinge system comprises a guide hinge and a shaft select,
    wherein the guide hinge is disposed under the lever shift body,
    wherein the shaft select is inserted into the guide hinge,
    wherein the shift lever rotates about the shaft select in a select direction and rotates about the guide hinge in a shift direction,
    wherein the shift position sensor comprises a magnet and a detection sensor,
    wherein the magnet is disposed under the hinge system,
    wherein the detection sensor is disposed under the magnet, and wherein the detection sensor detects a motion of the magnet and a shift stage is selected.

2. The shift control device of claim 1, wherein the lever shift body comprises:
a body part to which the shift lever is coupled;
a first wing which is formed to protrude from the body part in one direction; and
a second wing which is formed to protrude in a direction opposite to the one direction,
wherein a plurality of protrusions protruding downward from a bottom surface of the body part are formed on the body part,
wherein a through-hole passing through the protrusions is formed in each of the plurality of protrusions,
and wherein a wing groove having a predetermined depth is formed in the first wing and the second wing respectively in such a manner as to be inclined with respect to the body part.

3. The shift control device of claim 2, further comprising a bracket, wherein the detent system comprises:
a bullet elastic member;
a bullet bar which is elastically supported by one end of the bullet elastic member; and
a groove which has a plurality of catching grooves and is disposed on the bullet bar,
wherein the groove is fixed to an inner surface of the bracket,
wherein one end of the bullet bar is elastically supported by the bullet elastic member and another end of the bullet bar contacts the groove,
and wherein the bullet elastic member and the bullet bar are disposed in the wing groove.

4. The shift control device of claim 1, wherein the hinge system further comprises:
a bush which is fastened to the guide hinge; and
a holder which is fastened to the bush,
wherein a longitudinal direction of the guide hinge is an x-axis direction,
wherein a direction vertically perpendicular to the longitudinal direction of the guide hinge is a y-axis direction,
wherein a direction horizontally perpendicular to the longitudinal direction of the guide hinge is a z-axis direction,
wherein the guide hinge comprises a first through-hole and a second through-hole,
wherein the first through-hole is formed to pass through the guide hinge in the z-axis direction,
wherein the second through-hole is formed to pass through the guide hinge in the y-axis direction,
wherein the bush is fastened to both ends of the guide hinge in the x-axis direction, respectively,
and wherein the shaft select is disposed in the first through-hole.

5. The shift control device of claim 4,
wherein the lever shift body comprises a body part to which the shift lever is coupled,
wherein a plurality of protrusions protruding downward from a bottom surface of the body part are formed on the body part,
wherein the plurality of protrusions comprise a first protrusion, a second protrusion, and a third protrusion,
wherein the shaft select is disposed in the through-hole formed in the first protrusion, the second protrusion, and the third protrusion respectively,
wherein the first protrusion and the third protrusion are disposed on both ends of the shaft select,
and wherein the second protrusion is inserted into the second through-hole.

6. The shift control device of claim 5,
wherein a groove opened downward is formed in a bottom surface of the second protrusion,
and wherein the magnet is disposed in the groove formed in the bottom surface of the second protrusion.

7. The shift control device of claim 4,
wherein the base comprises a base groove and a holder fastening portion,
wherein the hinge system is disposed on the base groove,
and wherein the holder is disposed on the holder fastening portion.

8. The shift control device of claim 4,
wherein the guide hinge further comprises a hinge protrusion,
wherein the hinge protrusion protrudes from both ends of the guide hinge in the x-axis direction by a predetermined length respectively,
and wherein the bush is fastened to the hinge protrusion.

9. The shift control device of claim 4,
wherein the bush comprises a ring and a bush protrusion,
wherein a diameter of the ring is reduced from one side to another side thereof,
and wherein the bush protrusion protrudes circumferentially from one side of the ring by a predetermined length.

10. The shift control device of claim 9, wherein the ring or the bush protrusion has one or more incised portions.

11. The shift control device of claim 9,
wherein the holder comprises a groove,
and wherein the ring is inserted into the groove of the holder.

12. The shift control device of claim 1,
wherein the lever shift body comprises a body part to which the shift lever is coupled,
wherein the shift lever comprises a rod, a rod elastic member, and a shift pipe,
wherein a body part top surface groove having a predetermined depth is formed in a top surface of the body part,
wherein the shift pipe is inserted into the body part top surface groove,
wherein the rod and the rod elastic member are inserted into the shift pipe,
and wherein the rod is disposed on the rod elastic member.

13. The shift control device of claim 12, further comprising a rod pin,
wherein the rod pin is a cylindrical rod or a polygonal rod, which has a predetermined length,
wherein a pin through-hole passing through a side surface of the body part is formed in an upper side surface of the body part,
wherein a pipe through-hole passing through the shift pipe in a direction perpendicular to a longitudinal direction of the shift pipe is formed in a lower portion of the shift pipe,
wherein a rod through-hole passing through the rod in a direction perpendicular to a longitudinal direction of the rod is formed in a lower portion of the rod,
and wherein the rod pin is inserted into the pin through-hole, the pipe through-hole, and the rod through-hole.

14. The shift control device of claim 13,
wherein the pin through-hole is formed to have a predetermined length from the upper side surface to a lower side surface of the body part, wherein the pipe through-hole is formed to have a predetermined length in the longitudinal direction of the shift pipe,
wherein the rod pin is arranged to pass through the pin through-hole, the pipe through-hole, and the rod through-hole,
and wherein the rod pin moves along the pin through-hole and the pipe through-hole in the longitudinal direction of shift pipe.

* * * * *